P. M. KELLOGG.
BOLT AND NUT LOCK.
APPLICATION FILED JULY 6, 1920.

1,355,342.

Patented Oct. 12, 1920.

UNITED STATES PATENT OFFICE.

PAUL M. KELLOGG, OF DETROIT, MICHIGAN.

BOLT AND NUT LOCK.

1,355,342. Specification of Letters Patent. Patented Oct. 12, 1920.

Application filed July 6, 1920. Serial No. 394,101.

*To all whom it may concern:*

Be it known that I, PAUL M. KELLOGG, citizen of the United States, residing at Detroit, county of Wayne, State of Michigan, have invented a certain new and useful Improvement in Bolt and Nut Locks, and declare the following to be a full, clear, and exact description of the same, such as will enable others skilled in the art to which it pertains to make and use the same, reference being had to the accompanying drawings, which form a part of this specification.

My invention relates to an improvement in bolt and nut locks, shown in the accompanying drawings and more particularly described in the following specification and claims.

One of the objects in my invention is to provide a simple and inexpensive device that will effectually secure the nut and bolt against accidental release.

A further object is to provide a device in which the nut may be removed from the bolt when required, to be again secured thereto, without injury to either the nut or the bolt.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings forming part of this specification:—

Figure 1 is an elevation of a bolt and nut showing means for securing the nut to the bolt when properly adjusted.

Referring now to the letters of reference placed upon the drawings:—

Figure 3:
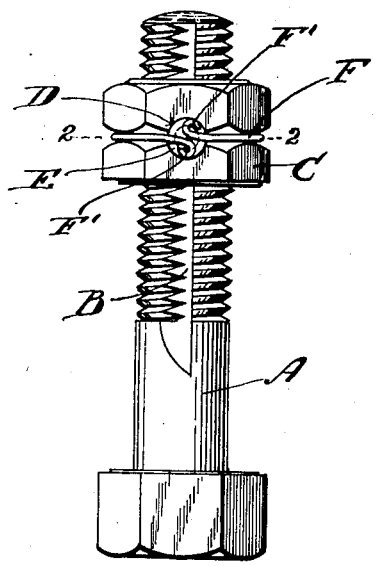
Fig. 3 is a similar cross-sectional view of a modification of the device.
Figure 2:
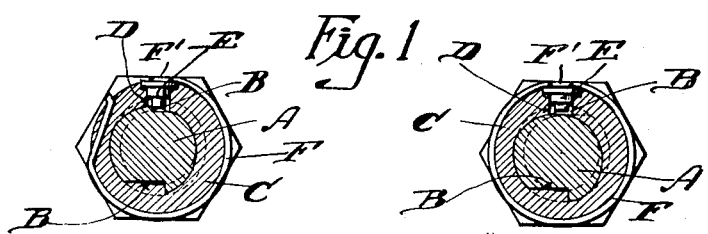
Fig. 2 is a cross-sectional view through the nut and bolt on or about line 2—2 of Fig. 1.

A, indicates a bolt provided with a plurality of longitudinal peripheral grooves B, intersecting the threaded portion of the bolt. C, indicates a nut provided with a counterbored aperture D, through its wall to receive a pin or detent E. F, denotes a divided spring ring lodged in the peripheral groove with its ends F', adapted to bear upon the enlarged head of the detent E, to force the latter into the longitudinal grooves of the bolt to secure the nut against release when adjusted. Instead of both ends of the spring bearing upon the detent, only one end may bear thereon, the other end extending into an aperture provided in the nut to prevent the spring from being accidentally displaced, (as shown in Fig. 3).

Having indicated the several parts by reference letters the construction and operation of the device will be readily understood:—

It will be seen that the nut may be adjusted upon the bolt in the regular way and when properly set the nut is held against accidental release by the action of the detent E, entering the groove in the bolt. While the drawings only show the bolt provided with two diametrically arranged longitudinal grooves, any number of grooves may be employed to provide for securing the nut following a very close adjustment of the latter.

It will be noted that the counterbore surrounding the aperture D in the nut forms a shoulder to limit the inward movement of the pin or detent. Thus when the nut is detached from the bolt the action of the spring F, will not cause the detent to be disassociated from the nut by discharging the detent through the centrally tapped bore of the nut.

Having thus described my invention what I claim is—

1. In a device of the character described, a bolt provided with a plurality of grooves intersecting the threaded portion thereof, a nut fitted to said bolt having a radial counterbored opening, a movable detent or pin provided with an enlarged head fitted in said counterbored opening, adapted to be forced into the longitudinal grooves of the bolt, and a spring carried by said nut adapted to force said detent into the groove of the bolt, whereby the nut is secured when adjusted.

2. In a device of the character described, a bolt provided with a plurality of longitudinal grooves intersecting its threaded portion, a nut fitted to said bolt provided with a radial counterbored opening through its wall and with a peripheral groove communicating with said counterbored opening, a movable pin having an enlarged head lodged in said counterbored opening adapted to be projected into the longitudinal grooves of the bolt, and a resilient element lodged in the peripheral groove of the nut with ends adapted to bear upon the movable pin whereby the latter is forced into the grooves of the bolt upon the adjustment of the nut.

3. In a device of the character described, a bolt having a plurality of longitudinal grooves intersecting its threaded portion, a nut provided with a counterbored opening for a movable pin adapted to be projected into the said grooves, a movable pin having an enlarged head lodged in said counterbored opening and a resilient element secured to said nut adapted to force said pin into the grooves of the bolt, whereby the nut is secured against release.

4. In a device of the character described, a bolt having a plurality of longitudinal grooves intersecting its threaded portion, a nut provided with a counterbored opening for a movable pin adapted to be projected into the said grooves, a movable pin having an enlarged head, and a resilient element secured to said nut adapted to bear upon the enlarged head of the pin to force the pin into the grooves of the bolt, whereby the nut is secured against release.

In testimony whereof, I sign this specification in the presence of two witnesses.

PAUL M. KELLOGG.

Witnesses:
S. E. THOMAS,
IDA GOREN.